(12) United States Patent
Bonnet et al.

(10) Patent No.: US 7,912,828 B2
(45) Date of Patent: Mar. 22, 2011

(54) PATTERN SEARCHING METHODS AND APPARATUSES

(75) Inventors: Olivier Bonnet, Paris (FR); Frédéric De Jaeger, Paris (FR); Toby Paterson, Paris (FR)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 11/710,182

(22) Filed: Feb. 23, 2007

(65) Prior Publication Data

US 2008/0243841 A1    Oct. 2, 2008

(51) Int. Cl.
*G06F 7/00*        (2006.01)
*G06F 15/16*       (2006.01)
*G10L 15/06*       (2006.01)

(52) U.S. Cl. ......... 707/706; 704/243; 704/244; 709/246

(58) Field of Classification Search ............. 707/6, 102; 709/246; 704/243, 244
See application file for complete search history.

(56) References Cited

U.S. PATENT DOCUMENTS

| | | |
|---|---|---|
| 4,791,556 A | 12/1988 | Vilkaitis |
| 5,034,916 A | 7/1991 | Ordish |
| 5,155,806 A | 10/1992 | Hoeber et al. |
| 5,189,632 A | 2/1993 | Paajanen et al. |
| 5,390,281 A | 2/1995 | Luciw et al. |
| 5,434,777 A | 7/1995 | Luciw |
| 5,442,742 A | 8/1995 | Greyson et al. |
| 5,477,447 A | 12/1995 | Luciw et al. |
| 5,583,921 A | 12/1996 | Hidaka |
| 5,608,624 A | 3/1997 | Luciw |
| 5,621,903 A | 4/1997 | Luciw et al. |
| 5,627,948 A | 5/1997 | Fukunaga |
| 5,644,735 A | 7/1997 | Luciw et al. |
| 5,666,552 A | 9/1997 | Greyson et al. |
| 5,687,333 A | 11/1997 | Dobashi et al. |
| 5,692,032 A | 11/1997 | Seppänen et al. |
| 5,708,845 A | 1/1998 | Wistendahl et al. |

(Continued)

FOREIGN PATENT DOCUMENTS

EP        0 458 563 A2    11/1991

(Continued)

OTHER PUBLICATIONS

"Postal Address Detection from Web Documents" Lin et al., IEEE Computer Society, copyright 2005 (hereafter Lin).*

(Continued)

*Primary Examiner* — Apu M Mofiz
*Assistant Examiner* — Cindy Nguyen
(74) *Attorney, Agent, or Firm* — Blakely, Sokoloff, Taylor & Zafman LLP

(57) ABSTRACT

A computer-based method for identifying patterns in computer text using structures defining types of patterns which are to be identified, wherein a structure comprises one or more definition items, the method comprising assigning a weighting to each structure and each definition item; searching the computer text for a pattern to be identified on the basis of a particular structure, a pattern being provisionally identified if it matches the definition given by said particular structure; in a provisionally identified pattern, determining those of the definition items making up said particular structure that have been identified in the provisionally identified pattern; combining the weightings of the determined definition items and optionally, the weighting of the particular structure, to a single quantity; assessing whether the single quantity fulfils a given condition; depending on the result of said assessment, rejecting or confirming the provisionally identified pattern.

12 Claims, 10 Drawing Sheets

```
Examples of conventional structure definitions
#1:
us_state_code{bind:state} := "AL" | "AK" | ... | "WY";
#2:
us_zip_code{bind:code} := [0-9]{5};
#3:
postal_code :=
// ex: CA. 12345
    us_state_code "."? (some_spaces us_zip_code)?
// ex: 12345 CA
    | us_zip_code (some_spaces us_state_code)?
#4:
number := [0-9]+;
#5:
known_street_type := "Street" | "Boulevard" | ...;
#6:
city := known_city | some_capitalized_words;
#7:
street_address{bind} :=
    number{bind:number} some_spaces some_capitalized_words
    (known_street_type{bind:type})? comma_or_spaces postal_code? some_spaces city;
```

U.S. PATENT DOCUMENTS

| | | | |
|---|---|---|---|
| 5,790,875 | A | 8/1998 | Andersin et al. |
| 5,794,142 | A | 8/1998 | Vanttila et al. |
| 5,815,138 | A | 9/1998 | Tsubaki et al. |
| 5,815,142 | A | 9/1998 | Allard et al. |
| 5,838,458 | A | 11/1998 | Tsai |
| 5,859,636 | A | 1/1999 | Pandit |
| 5,864,789 | A | 1/1999 | Lieberman et al. |
| 5,900,005 | A | 5/1999 | Saito |
| 5,946,629 | A | 8/1999 | Sawyer et al. |
| 5,946,647 | A | 8/1999 | Miller et al. |
| 5,966,652 | A | 10/1999 | Coad et al. |
| 5,987,029 | A | 11/1999 | Kotani et al. |
| 6,026,233 | A | 2/2000 | Shulman et al. |
| 6,034,689 | A | 3/2000 | White et al. |
| 6,044,250 | A | 3/2000 | Kuramatsu et al. |
| 6,049,796 | A | 4/2000 | Siitonen et al. |
| 6,125,281 | A | 9/2000 | Wells et al. |
| 6,222,549 | B1 | 4/2001 | Hoddie |
| 6,249,283 | B1 | 6/2001 | Ur |
| 6,262,735 | B1 | 7/2001 | Eteläperä |
| 6,282,435 | B1 | 8/2001 | Wagner et al. |
| 6,323,853 | B1 | 11/2001 | Hedloy |
| 6,460,058 | B2 | 10/2002 | Koppolu et al. |
| 6,608,637 | B1 | 8/2003 | Beaton et al. |
| 6,622,306 | B1 | 9/2003 | Kamada |
| 6,711,624 | B1* | 3/2004 | Narurkar et al. .............. 719/321 |
| 7,467,181 | B2 | 12/2008 | McGowan et al. |
| 2002/0194379 | A1* | 12/2002 | Bennett et al. ................ 709/246 |
| 2004/0042591 | A1 | 3/2004 | Geppert et al. |
| 2005/0022115 | A1* | 1/2005 | Baumgartner et al. ....... 715/513 |
| 2005/0125746 | A1* | 6/2005 | Viola et al. .................... 715/853 |
| 2007/0282900 | A1* | 12/2007 | Owens et al. ............. 707/104.1 |
| 2008/0293383 | A1 | 11/2008 | Rastas |
| 2009/0006994 | A1 | 1/2009 | Forstall et al. |
| 2009/0235280 | A1 | 9/2009 | Tannier et al. |
| 2009/0292690 | A1 | 11/2009 | Culbert |

FOREIGN PATENT DOCUMENTS

| | | |
|---|---|---|
| EP | 0 458 563 B1 | 11/1991 |
| EP | 0 698 845 A1 | 2/1996 |
| EP | 0 698 845 B1 | 1/2001 |
| JP | 3046855 A | 2/1991 |
| JP | 10040014 A | 2/1998 |
| JP | 11088633 A | 3/1999 |
| WO | WO 95/34998 | 12/1995 |
| WO | WO 97/32439 | 9/1997 |
| WO | WO 99/66747 | 12/1999 |
| WO | WO 2008/109835 A2 | 9/2008 |
| WO | WO 2009/041982 A1 | 4/2009 |

OTHER PUBLICATIONS

Lerman, Kristina et al. "Automatically Labeling the Inputs and Outputs of Web Services," *Proceedings of the National Conference on Artificial Intelligence (AAAI-2006)*, Menlo Park, CA, 2006, 6 pages.
Lerman, Kristina et al. "Populating the Semantic Web," *Proceedings of the AAAI 2004 Workshop on Advances in Text Extraction and Mining*, 2004, 6 pages.
Lerman, Kristina et al. "Wrapper Maintenance: A Machine Learning Approach," *Journal of Artificial Intelligence Research*, 18 (2003), pp. 149-181.
PCT International Search Report and Written Opinion for PCT International Appln. No. US2008/002263, mailed Aug. 4, 2008 (12 pages).
Eudora Mail Pro, "Windows Version 3.0 User Manual", Sep. 1996, pp. 3 total.
Eudora Mail Pro, "Version 3.0 for Windows User Manual", Jun. 1997, pp. 198 total.
Eudora Mail Light, "Version 3.1 for Macintosh User Manual", Apr. 1997, pp. 190 total.
International Preliminary Report on Patentability and Written Opinion for International PCT No. PCT/US2008/002263, mailed on Sep. 3, 2009, pp. 8 total.
Apple Data Detectors 1.0.2. Read Me, 2 pgs.
Apple Internet Address Detectors User's Manual, Aug. 28, 1997, pp. 1-16.
MacWeek Report, Aug. 8, 1996, 2 pgs.
EMailman($^{SM}$) Internet Address Detectors, http://www.emailman.com/mac/iad.html, Jan. 12, 2004, 3 pgs.
MacAddicts at MacWorld, exclusive.gif, 5 pgs.
Apple Data Detectors, Dec. 30, 1996, 7 pgs.
Welcome to Apple Data Detectors, Apple Data Detectors, Mar. 4, 1997, 19 pgs.
Claris for Macintosh, 62 pages
Welcome to Apple Data Detectors, Apple Data Detectors, Apr. 8, 1997, 11 pgs.
James Staten, Special Report Apple Looks to the Future, James Staten, Ziff-Davis Publishing, Aug. 7, 1996, 2 pgs.
Mike Langberg, Show of Potential Apple Breaks New Ground by Displaying What's on Its Drawing Board "Innovation Is At the Heart of What We Do", Aug. 7, 1996, San Jose Mercury News, 2 pgs.
Apple Introduces Internet Address Detectors, Technology Makes It Easier to Manage and Perform Actions with Internet Addresses; Extends Innovative Capabilities Delivered with Mac OS 8, http://www.apple.com/pr/library/1997/q4/970908.pr.rel.internet.html,Sep. 8, 1997, 3 pgs.
The AppleScript Sourcebook—AppleScript Editors, AppleScript Editors, Utilities & Environments, Tools for creating and using AppleScript scripts, including editors, application generators, utilities, and command-line, menu and button bar execution environments, webmaster@applescriptsourcebook.com. http://www.AppleScriptSourcebook.com/links/applescripteditors.html, Oct. 13, 2002, 6 pgs.
ADD Depot, http://web.archive.org/web/20000819081818/http://homepage.mac.com/matthewmiller/add/, 4 pgs.
Thomas Bonura and James R. Miller ,Drop Zones, An Extension to LiveDoc, http://www.acm.org/sigchi/bulletin/1998.2/bonura.html , SIG CHI, vol. 30, No. 2, Apr. 1998, 9 pgs.
Thomas Bonura and James R. Miller ,From Documents to Objects, An Overview of LiveDoc, SIGCHI Bulletin vol. 30 No. 2, Apr. 1998: From Documents to Objects, SIG CHI, vol. 30, No. 2, Apr. 1998, 11 pgs.
Bonnie A. Nardi, James R. Miller, and David J. Wright, Collaborative,Programmable Intelligent Agents, Mar. 1998/vol. 41, No. 3 Communications of the ACM, pp. 96-104.
A Farewell to the Apple Advanced Technology Group, http://www.acm.org/sigchi/bulletin/1998.2/, SIG CHI, vol. 30, No. 2, Apr. 1998, 3 pgs.
Apple Internet Address Detectors User's Manual, Aug. 28, 1997, 16 pgs.
What are Apple Data Detectors?, JRM (ver 4.0),Copyright © 1997 Apple Computer, Inc., 5 pgs.
The Apple Data Detectors FAQ, JRM (v. 4.0), Copyright © 1997 Apple Computer, Inc., 3 pgs.
Example of e-mail, 1 pg.
Gregory D. Abowd, Anind Dey, Andy M. Wood, Applying Dynamic Integration as a Software Infrastructure for Context-Aware Computing, 10 pgs.
Milind S. Pandit and Sameer Kalbag,The Selection Recognition Agent: Instant Access to Relevant Information and Operations, IUI 97, Orlando Florida USA, © 1997 ACM 0-89791-839-8/96/01, pp. 47-52.
Gregory D. Abowd, Anind K. Dey, Robert Orr & Jason Brotherton, Context-Awareness in Wearable and Ubiquitous Computing, Proceedings of the First International Syrnposium on Wearable Computers (ISWC '97) 0-8186-8192-6/97 © 1997 IEEE, 3 pgs.
AndrewWood, Anind Dey, Gregory D. Abowd, CyberDesk: Automated Integration of Desktop and Network Services, CHI 97. Atlanta GA USA,Copyright 1997 ACM 0-g9791-802-9/97/03, 2 pgs.
Qualcomm, Eudora ProTM for Newton®, Version 1.0 for Newton 2.0 and 2.1, pp. 1-22.
Newton, Apple MessagePad Handbook, pp. 1-358.
Newton Solutions Guide, Software, Peripherals and Accessories for Newton PDAs, 64 pgs.
James R. Miller and Thomas Bonura ,From Documents to Objects an Overview of LiveDoc, SIGCHI Bulletin vol. 30, No. 2 Apr. 1998, pp. 53-58.
James R. Miller and Thomas Bonura ,Drop Zones an Extension, SIGCHI Bulletin vol. 30, No. 2 Apr. 1998, pp. 59-63.

Chris Schmandt, Phoneshell: the Telephone as Computer Terminal, 10 pgs.
Hui Wang, David Bell, John Hughs, Piyush Ojha, Neural network approach to relevance, IEEE, 1995, pp. 1961-1965.
Cara Cunningham, Apple kicks off Macworld with talk of revival, new software demos, InfoWorld Electric, Jan. 11, 2004, 2 pgs.
Writing new detectors for Apple Data Detectors, Copyright © 1997, Apple Computer, Inc., 8 pgs.
Welcome to.AppleWeb, 1997, 4 pgs.
Apple Data Detectors, Apple Inc., 1997, 4 pgs.
Contextual Menu Manager/Apple Data Detectors, 6 pgs.
Apple Introduces Internet Address Detectors, http://www.apple.com/pr/library/1997/q4/97090S.pr.rel.internet.html ,1997, 44 pgs.
Developer's Guide to Apple Data Detectors, for version 1.0.2, Apple Computer, Inc., Dec. 1, 1997, 34 pgs.
Apple Data Detectors User's Manual, Copyright © 1997 Apple Computer, Inc., 16 pgs.
Communications of the ACM, Mar. 1998-vol. 41, No. 3, 12 pgs.
First International Symposium on Wearable Computers, IEEE, Oct. 13-14, 1997, 8 pgs.
CHI 97 Human Factors in Computing Systems, Mar. 22-27, 1997, 9 pgs.
Proceedings of the ACM Symposium on User Interface Software and Technology, UIST 97, 10th Annual Symposium on User Interface Software and Technology,Oct. 14-17, 1997, 9 pgs.
CyberDesk: A Framework for Providing Self-Integrating Ubiquitous Software Services, Anind K. Dey, Gregory Abowd, Mike Pinkerton, Andrew Wood, 10 pgs.
Apple Data Detectors User's Manual, Copyright © 1997 Apple Computer, Inc., 16 pgs.
Milind S. Pandit, Sameer Kalbag, The Selection Recognition Agent: Instant Access to Relevant Information and Operations, Copyright © 1997 ACM 0-89791-839-8/96/01.
Michael David Pinkerton, Ubiquitous Computing: Extending Access to Mobile Data, Georgia Institute of Technology, May 1997, 98 pgs.
1997 International Conference on Intelligent User Interfaces,IUI97 Conference Proceedings, ACM, Jan. 6-9, 1997, 14 pgs.
Proceedings of the Third Annual Conference on Autonomous Agents, ACM, May 1-5, 1999.
Dunn, JM and Stern, EH,Touch-Screen/Graphics Receive Message Application, IBM TDB, IPCOM000111975D Apr. 1, 1994,TDB v37 n4A 04-94 p. 451-454, Mar. 26, 2005, 5 pgs.
Chris O'Malley,Simonizing the PDA, BellSouth's communicative Simon is a milestone in the evolution of the PDA, http://web.archive.org/web/19990221174856/byte.com/art/9412/sec11/art3.htm, Dec. 1994, 7 pgs.
Salahshour, A and Williams, ML, Preferred Media Communication Establishment Mechanism, IBM Technical Disclosure Bulletin, vol. 37 No. 03 Mar. 1994, 3 pgs.
Gregory D. Abowd, Anind K. Dey, and Andrew Wood, Future Computing Environments, Applying Dynamic Integration as a Software Infrastructure for Context-Aware Computing, Cyberdesk, 1998, 17 pgs.
Gregory D. Abowd, Anind K. Dey, Gregory Abowd, Robert Orr & Jason Brotherton, Future Computing Environments , Context-Awareness in Wearable and Ubiquitous Computing, 1997, 15 pgs.
Anind K. Dey, Gregory D. Abowd, Future Computing Environments , PUI Workshop Submission, CyberDesk: The Use of Perception in Context-Aware Computing, 5 pgs.
Anind K. Dey, Future Computing Environments, Context-Aware Computing: The CyberDesk Project, Mar. 23-25, 1998, 9 pgs.
http ://web. archive,org/web/19980215054229/www.macos8.com/macos 8. shtml, 3 pgs.
Anind K. Dey , Gregory D. Abowd, Mike Pinkerton, and Andrew Wood, Future Computing Environments, CyberDesk: A Framework for Providing Self-Integrating Ubiquitous Software, 1997, 18 pgs.
Apple Introduces Internet Address Detectors, Technology Makes it Easier to Manage and Perform Actions with Internet Addresses; Extends Innovative Internet CapabiUties Delivered with Mac OS 8, Sep. 8, 1997, 44 pgs.
Newton 1995 Manual, 1 pg.

* cited by examiner

FIG. 1

Examples of conventional structure definitions

```
#1:
us_state_code{bind:state} := "AL" | "AK" | ... | "WY";
#2:
us_zip_code{bind:code} := [0-9]{5};
#3:
postal_code :=
// ex: CA 12345
    us_state_code " ." ? (some_spaces us_zip_code)?
// ex: 12345 CA
    | us_zip_code (some_spaces us_state_code)?
#4:
number := [0-9]+;
#5:
known_street_type := "Street" | "Boulevard" | ...;
#6:
city := known_city | some_capitalized_words;
#7:
street_address{bind} :=
    number{bind:number} some_spaces some_capitalized_words
    (known_street_type{bind:type})? comma_or_spaces postal_code? some_spaces city;
```

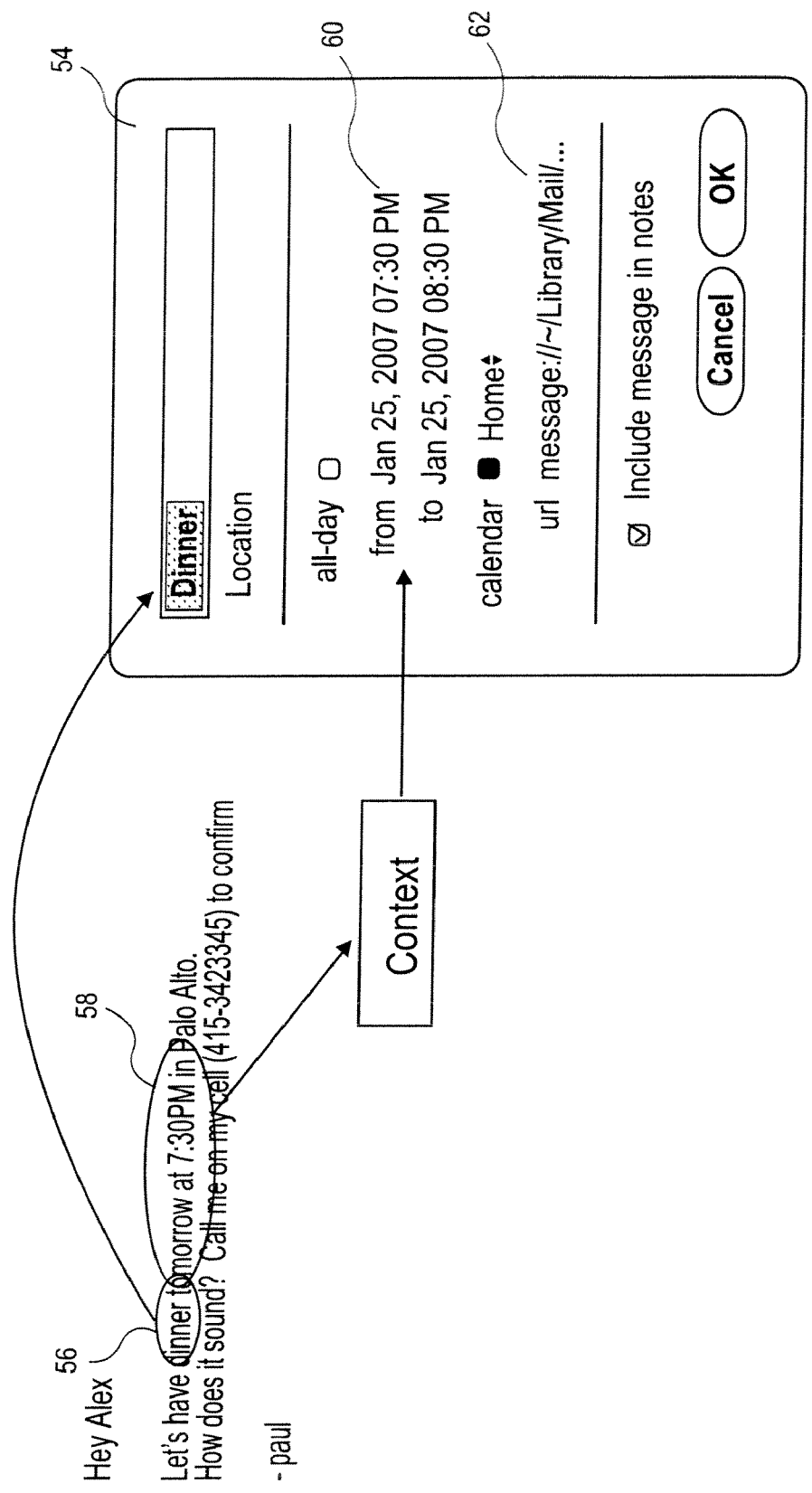

FIG. 7

*Examples of structure definitions according to the invention*

1:
us_state_code{bind:state,bonus=+5} := "CA" | ...;

[...]
5:
known_street_type{bonus=+5} := "Street" | ...;
6:
city := known_city{bonus=+5} | some_capitalized_words;

[...]
7:
street_address{bind,bonus=-10} :=
number{bind:number} some_spaces some_capitalized_words
(known_street_type{bind:type})? comma_or_spaces postal_code? some_spaces
city;

PATTERN SEARCHING METHODS AND APPARATUSES

BACKGROUND OF THE INVENTION

1. Field of the Invention

The invention relates generally to a system and method for extracting relevant information from raw text data. More particularly, the invention concerns itself with a system and method for identifying patterns in text using structures defining types of patterns. In this context a "pattern" is to be understood as a part of a written text of arbitrary length. Thus, a pattern may be any series of alphanumeric characters within a text. Particular examples of patterns that might be identified in a text, such as a word-processor document or an email-text, are dates, events, numbers such as telephone numbers, addresses or names.

2. Description of the Background Art

Technologies for searching interesting patterns in a text presented by a computer to a user (in the following "computer text") are well-known. U.S. Pat. No. 5,864,789 is one example of a document describing such a technology.

A system that searches patterns in a computer text and provides to the user some actions based on the kind of identified patterns is described in two variants The first variant is an application termed "AppleDataDetectors" and the second variant an application termed "LiveDoc".

Both variants use the same method to find patterns in an unstructured text. The engine performing the pattern search refers to a library containing a collection of structures, each structure defining a pattern that is to be recognized. FIG. 1 gives an example of seven different structures (#1 to #7), which may be contained in such a structure library. Each of the seven structures shown in FIG. 1 defines a pattern worth recognizing in a computer text. The definition of a pattern is a sequence of so-called definition items. Each definition item specifies an element of the text pattern that the structure recognizes. A definition item may be a specific string or a structure defining another pattern using definition items in the form of strings or structures. For example, structure #1 gives the definition of what is to be identified as a US state code, the definition following the ":=" sign. According to this definition, a pattern in a text will be identified as a US state code if it corresponds to one of the strings between quotation marks, i.e. one of the definition items, such as AL or AK or WY (Note that the symbol "|" means "OR").

The structure #7 gives a definition of what is to be identified as a street address. In this context, a street address is to be understood as a postal address excluding the name of the recipient. A typical example of a street address is: 225 Franklin Street, 02110 MA Boston. According to the definition given by structure #7, a pattern is a street address if it has elements matching the following sequence of definition items:

a number in the sense as defined by structure #4, followed by
some spaces, followed by
some capitalized words, followed by,
optionally, a known street type in the sense as defined by structure #5 (the optional nature being indicated by the question mark behind the brackets surrounding "known_ street_type"), followed by
a coma or spaces, followed by,
optionally, a postal code in the sense as defined by structure #3, followed by
some spaces, followed by
a city in the sense as defined by structure #6.

This definition of a street address is deliberately broad in order to ensure that the application is able to identify not only street addresses written according to a single specific notation but also addresses written according to differing notations.

However, an application using such a broad definition is prone to the detection of a large number of false positives. For example, with the definition of a street address given above, the pattern "4 Apple Pies" will be wrongly recognized as a street address. The obvious solution to reduce the number of false positives is to make the structure definitions narrower. Yet, with narrow definitions there is an increased risk of missing interesting patterns.

At least certain embodiments of the present invention provide a method and system for identifying patterns in text using structures, which increase the flexibility of structure definitions and which, in particular, permit the formulation of structure definitions that lead to more accurate results during pattern identification.

SUMMARY OF THE DESCRIPTION

A computer-based method, in one embodiment, for identifying patterns in text using structures defining types of patterns which are to be identified, wherein a structure comprises one or more definition items, and wherein the methods include assigning a weighting to each structure and each definition item; searching the text for a pattern to be identified on the basis of a particular structure, a pattern being provisionally identified if it matches the definition given by said particular structure; in a provisionally identified pattern, determining those of the definition items making up said particular structure that have been identified in the provisionally identified pattern; combining the weightings of the determined definition items and optionally, the weighting of the particular structure, to a single quantity; assessing whether the single quantity fulfils a given condition; depending on the result of said assessment, rejecting or confirming the provisionally identified pattern.

Through the introduction of weightings for each structure and definition item, pattern definition and identification becomes more flexible and accurate. Indeed, in contrast to the conventional method of pattern identification, at least certain embodiments of a method of the invention introduce a supplementary test for the identification of patterns. It is no longer sufficient for a pattern to be recognized that it matches the definition of the corresponding structure. On top of that, at least certain embodiments of the invention use a second procedure which consists in performing a sort of plausibility check. The weightings of the definition items of the relevant structure that have been matched to the elements of the provisionally identified pattern must in combination fulfill a given condition. If this is the case, it is assumed that the identified pattern is sufficiently likely to really correspond to the relevant structure (e.g., if the structure defines telephone numbers, when the given condition is met by the combined weightings, it is assumed that the identified pattern is indeed a telephone number and not a false positive).

The introduction of weightings and of a probability test based on those weightings allows for structures with broad pattern definitions without the risk of an overly high number of false positives. A structure having a broad definition will lead to a lot of incorrect matches. However, these false positives may then be "sieved out" with the described "plausibility test" based on the assigned weightings. The weightings are assigned to the structures and definition items such that the combined weightings of a false positive are very unlikely to fulfill the given condition. The use of weightings gives more flexibility and freedom in the definition of structures and definition items.

A machine-implemented method is a method which is preferably implemented via a data processing system such as a computer. The term "computer" includes any data processing system such as any computing device as, for example, a desktop computer, laptop, personal digital assistant, mobile phone, multimedia device, notebook, or other consumer electronic devices and similar devices.

In the present context, a weighting is a quantity used to emphasize, to suppress or even to penalize a structure or definition item associated with it. A structure with a greater weighting is considered to be more desirable or more accurate than a structure with a lower, no or even a negative weighting. Preferably, the weighting is a number and in particular an integer. In the latter case, each weighting may take the form of either a bonus in the form of a positive integer, or a malus in the form of a negative integer. Within the context of the invention, the term "malus" is to be understood as being the antonym of the term "bonus". A "malus" may also be qualified as a penalty.

A bonus may be assigned to a structure or definition item if it is well-defined, meaning that there is a high probability for correct pattern identification if the identified pattern contains said structure or definition item. A malus or penalty may be assigned if the structure or definition item is ambiguous. This may mean that the structure or definition item allows different interpretations, only one of which leads to correct pattern identification. It may also mean that the structure or definition item defines a set of elements of which only a subset may be contained in the pattern sought-after.

In a preferred embodiment, each weighting is an integer multiple of the same integer. Accordingly, the weightings may be quantized as multiples of a single integer. This renders the weighting scheme of the invention more manageable and easier to implement.

In a most preferred embodiment, the weightings are quantized as multiples of the integer "1", meaning that the whole integer range is used for the weightings.

Preferably, the given condition corresponds to the single quantity being above or below a given threshold. Furthermore, the single quantity may be obtained by combining the weightings using one or more arithmetic operations, such as addition, subtraction, multiplication and/or division. The most preferred arithmetic operation is a summation over all weightings, the single quantity being the sum of all the weightings.

In a further aspect of the invention, which may also be implemented independently from the inventive weighting scheme described above, the structures are automatically generated or extended on the basis of information available from a data source, such as a calendar application or an address book application. For example, a structure defining the pattern "city name" may be automatically completed by the system with the help of city names fetched from an address book application containing postal addresses of user contacts or from another source of city names such as a locally stored (or remotely stored) database which includes city names. Each time a new contact is added to the address book, the corresponding city name may be automatically added to the structure "city name". This feature, which may be termed "automatic learning system", leads to an automatic increase in the knowledge base of known patterns and an automatic improvement of pattern detection as the system learns more and more from the data sources of the user. In particular, thanks to this "automatic learning" feature, there is less need for a programmer or user to actively administrate and update the structures and definition items as this is done "on the fly" by the system itself.

In yet a further aspect of the invention, which may as well be implemented independently from the inventive weighting scheme described above, the computer text is indexed using the patterns identified in it in order to improve search capabilities of computer texts. This means that interesting patterns that have been found in a text using the inventive or any other pattern identification method may be used to tag the text with corresponding metadata. In this way, any computer text can be flagged with all the patterns that have been identified in it. This type of text indexing may be used for more advanced searches in a desktop search application such as "Spotlight" from Apple Inc. of Cupertino, Calif. For example, thanks to the new metadata represented by the identified patterns, one may query all the texts that contain a date within a certain range or that contain a street address near a given city.

The inventive methods may be implemented in a computer-based system operable to execute said methods, the term "computer-based system" including any data processing system such as any computing device as, for example, a desktop computer, laptop, personal digital assistant, mobile phone, multimedia device, notebook, or other consumer electronic devices and similar devices. In a typical embodiment, a data processing system includes one or more processors which are coupled to memory and to one or more buses. The processor(s) is also typically coupled to input/output devices through the one or more buses. Examples of data processing systems are shown and described in U.S. Pat. No. 6,222,549, which is hereby incorporated herein by reference.

The inventive methods may also be implemented as a program storage medium having a program stored therein for causing a computer or other data processing system to execute said inventive methods. A program storage medium may be a hard disk drive, a USB stick, a CD, a DVD, a magnetic disk, a Read-Only Memory (ROM), or any other computer storage means.

BRIEF DESCRIPTION OF THE DRAWINGS

In the following, a preferred embodiment of the invention will be described, with reference to the accompanying drawings, in which:

FIG. 1 is a listing showing examples of conventional structure definitions;

FIGS. 6a to 6e show a third example of the user experience provided by the pattern detection application of FIG. 3;

FIG. 7 is a listing showing examples of structure definitions according to the invention, in contrast to the conventional definitions of FIG. 1;

DETAILED DESCRIPTION OF THE PREFERRED EMBODIMENT

Figure 2:
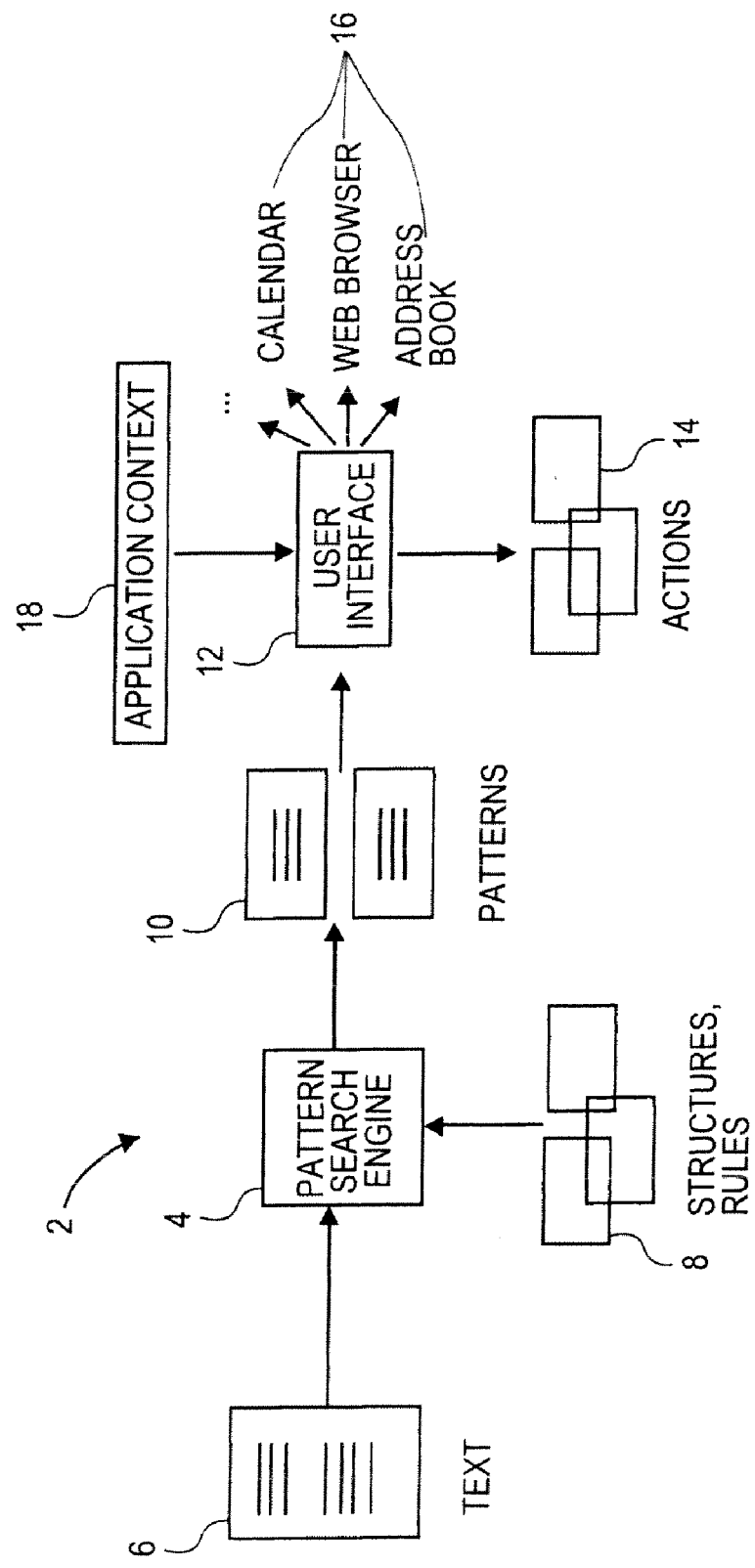
FIG. 2 is a block diagram showing the main elements of the preferred embodiment of the inventive pattern identification system.

FIG. 2 gives an overview of the inventive pattern identification system 2 and the way in which the system identifies interesting patterns. The core of the system 2 is the pattern search engine 4, which implements the inventive pattern identification method using weightings.

The engine 4 receives a text 6, which is to be searched for known patterns. This text 6 may be a word processor document or an email message. The text is often encoded in some standards-based format, such as ASCII or Unicode. If system 2 is implemented in a mobile phone, the text 6 may also be an SMS or MMS message. If system 2 is part of an instant messaging application, such as iChat from Apple Inc. of Cupertino, Calif., the text 6 may be a message text received via such an instant messaging application. As a further example, text 6 may also correspond to a web page presented by a web browser, such as Safari from Apple Inc. of Cupertino, Calif. Generally, text 6 may correspond to any text entity presented by a computing device to a user.

The text 6 is searched for patterns by the engine 4 according to structures and rules 8. The structures and rules 8 are formulated according to the inventive pattern identification method using weightings. The search by engine 4 yields a certain number of identified patterns 10. These patterns 10 are then presented to the user of the searched text 6 via user interface 12. For each identified pattern, the user interface 12 may suggest a certain number of actions 14. For example, if the identified pattern is a URL address the interface 12 may suggest the action "open corresponding web page in a web browser" to the user. If the user selects the suggested action a corresponding application 16 may be started, such as, in the given example, the web browser.

The suggested actions 14 preferably depend on the context 18 of the application with which the user manipulates the text 6. More specifically, when performing an action 14, the system can take into account the application context 18, such as the type of the application (word processor, email client, . . . ) or the information available through the application (time, date, sender, recipient, reference, . . . ) to tailor the action 14 and make it more useful or "intelligent" to the user.

Of course, the type of suggested actions 14 does also depend on the type of the associated pattern. If the recognized pattern is a phone number, other actions will be suggested than if the recognized pattern is a postal address.

Figure 3:
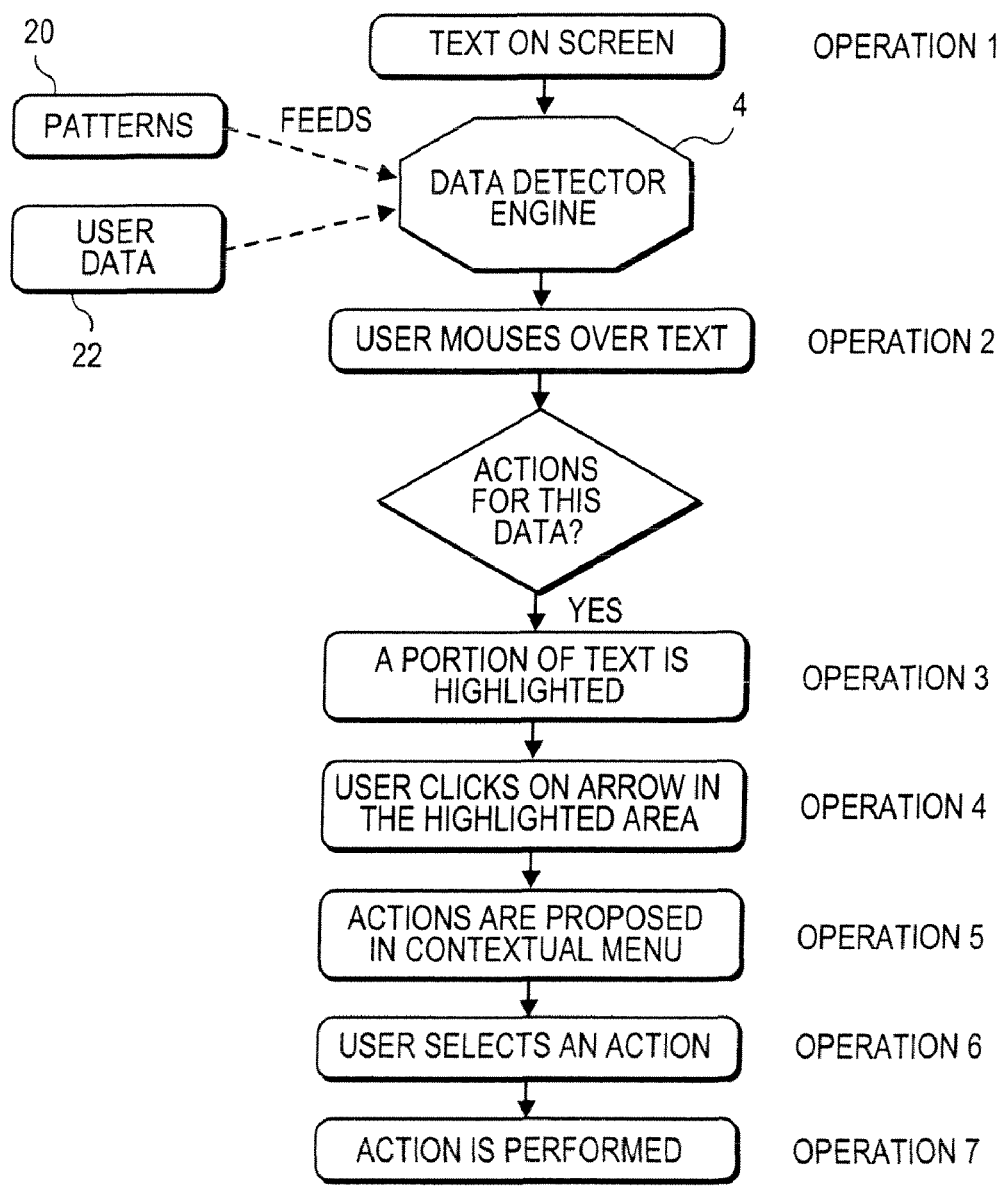
FIG. 3 is a flow chart illustrating the main operations of a preferred pattern detection application, as seen by the user, implementing the inventive pattern identification method.

FIG. 3 gives an example of the process of pattern detection as perceived by the user. Let us assume that a user of a desktop computer is currently manipulating a text document via a word processing application. The word processor presents the text on the screen of the computer (operation 1). While the user manipulates the text, a pattern search engine 4, which, in FIG. 3, is called a "Data Detector Engine", searches the text for known patterns 20. The search engine 4 preferably includes user data 22 in the structures of known patterns 20, which it may obtain from various data sources including user relevant information, such as a database of contact details included in an address book application or a database of favorite web pages included in a web browser. Adding user data 22 automatically to the set of identifiable patterns 20 renders the search user specific and thus more valuable to the user. Furthermore, this automatic addition of user data renders the system adaptive and autonomous, saving the user from having to manually add its data to the set of known patterns.

The pattern search is done in the background without the user noticing it. However, when the user places his mouse pointer over a text element that has been recognized as an interesting pattern having actions associated with it, this text element is visually highlighted to the user (operations 2 and 3 in FIG. 3).

The patterns identified in the text could of course also be highlighted automatically, without the need of a user action. However, it is preferred that the highlighting is only done upon a mouse rollover so that it is less intrusive.

The area highlighted by a mouse rollover includes a small arrow. The user can click on this arrow in order to visualize actions associated with the identified pattern in a contextual menu (operations 4 and 5 in FIG. 3). The user may select one of the suggested actions, which is then executed (operations 6 and 7 in FIG. 3).

Figures 4A, 4B:
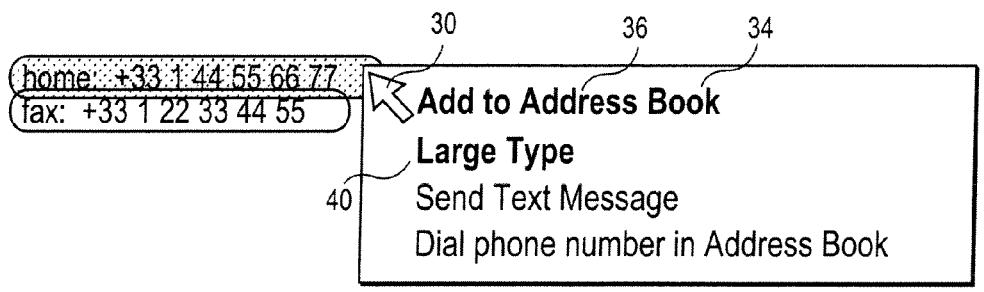
FIGS. 4a and 4b show a first example of the user experience provided by the pattern detection application of FIG. 3.
Figure 5:
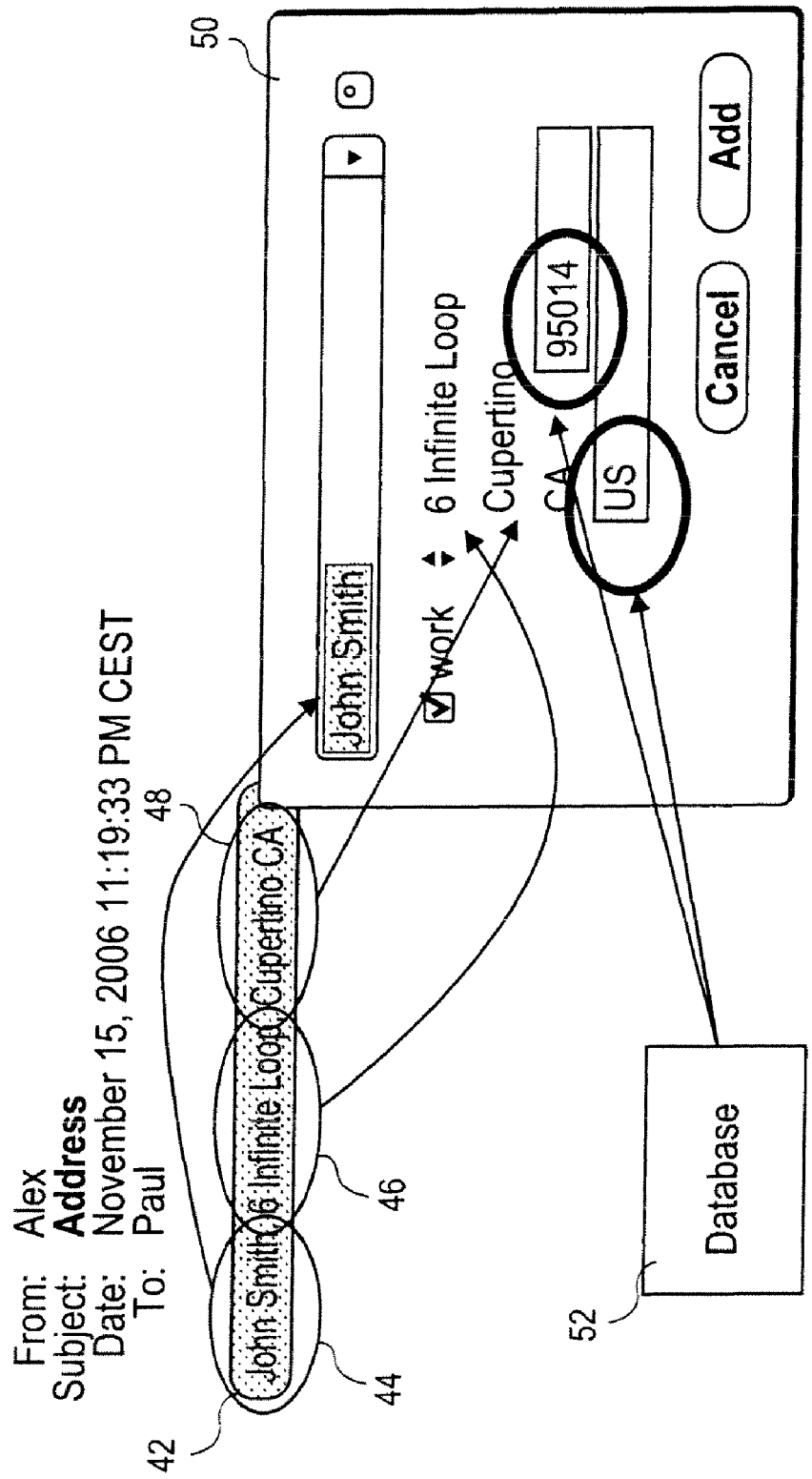
FIG. 5 shows a second example of the user experience provided by the pattern detection application of FIG. 3.

FIGS. 4 to 6 give three examples of the process illustrated in FIG. 3, as it is seen by the user on his screen.

In FIGS. 4a and 4b, the text is an email message 24 sent by "Alex" to "Paul". Paul has opened the message 24 in its email client. Once the message has been opened, the pattern search engine automatically scans the text for interesting patterns. In the example of FIGS. 4a and 4b the engine has identified two interesting patterns: a telephone number 26 and a fax number 28. These two patterns are only brought to the attention of the user Paul by highlighting when he positions his mouse pointer 30 over the phone or fax number. This situation is shown in FIG. 4a. Paul may then click on the small arrow 32 at the right hand end of the area highlighting the telephone number 26 in order to open a context menu 34. (cf. FIG. 4b). The context menu includes several possible actions that the user Paul might want to perform on telephone number 26. For example, Paul may add the telephone number to his address book by choosing the corresponding action 36. If Paul chooses action 36, his address book application will be automatically started, including a new entry with the telephone number 26. Preferably, the system auto-completes the new entry with other relevant data that it can deduce from the email message 24. For example, the system may automatically extract the name of the person associated with phone number 26 from the "From" line 38 of the email message 24. The system may also automatically add the fax number 28 to the new entry. Thus, in the present example, the new address book entry created by executing action 36 will already contain the name, telephone and fax number. Paul may then add the missing information manually.

Action 40, named "Large Type", allows Paul to obtain a magnified view of the telephone number so that he can read it off the screen easily when dialing.

FIG. 5 shows a second example, again with an email message as the search text. The action being executed in FIG. 5 is the creation of a new entry 50 in an address book based on the address pattern 42 detected in the email message. The detected pattern 42 is made of three elements 44, 46 and 48. The three elements have been identified as a name, a street and a city by the pattern search engine and accordingly have been automatically inserted in the adequate fields in the new entry 50, as depicted by the arrows. Furthermore, the system has determined that address pattern 42 is not a complete postal address. Indeed, address pattern 42 lacks a country code and a ZIP code. In the example shown in FIG. 5, the system retrieves this missing information from an external database 52. The system queries the database 52 using the information extracted from address pattern 42 (street and city) and database 52 returns the missing country code and ZIP code, as shown by the arrows.

There may be a special highlight in entry 50 to indicate to the user that some fields have been auto-completed.

Of course, the various embodiments of the invention are not limited to this specific example. The system may obtain any kind of supplementary information from any available data source in order to automate and enhance the action initiated by the user.

Figure 6E:
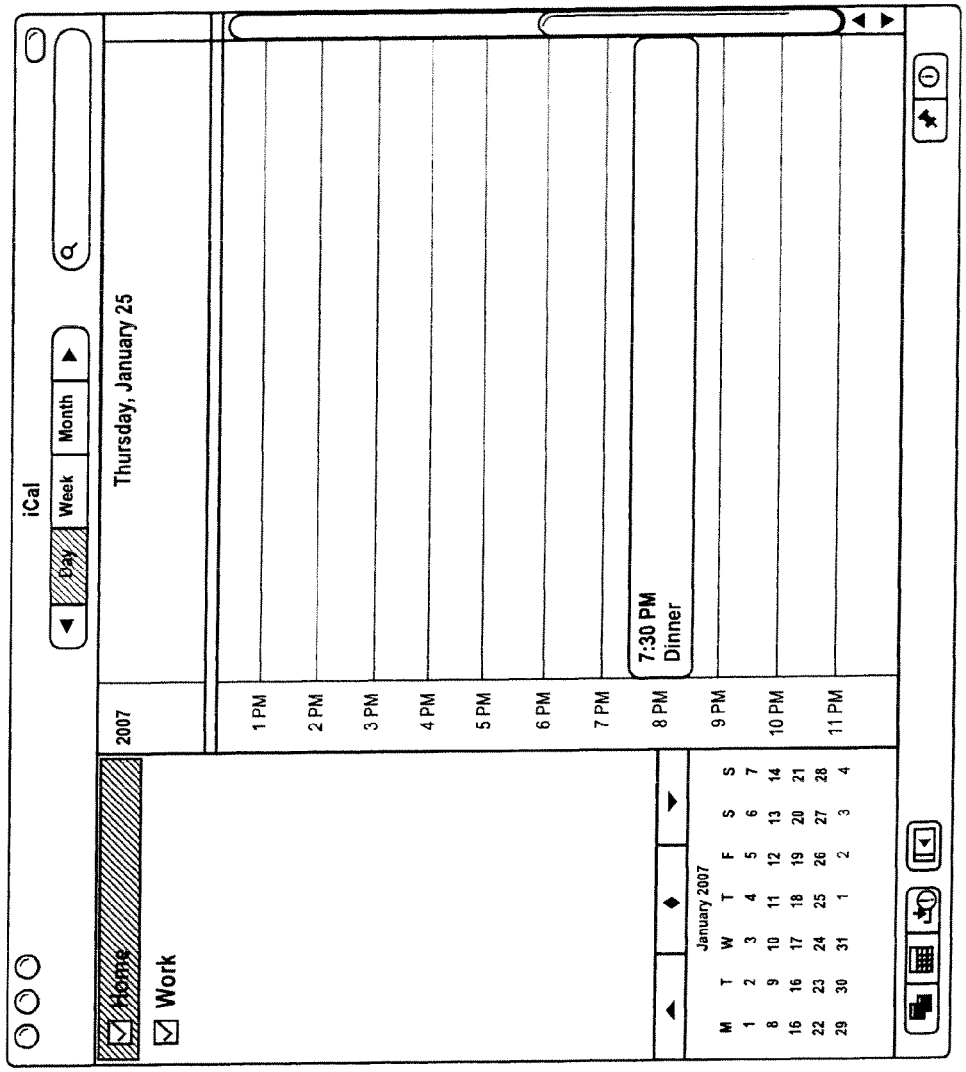

FIGS. 6a to 6e give a third example, again involving an email message. This time, the message contains a pattern indicative of an appointment. The appointment is part of the first sentence of the message, as can be seen from FIG. 6a. This pattern is identified by the pattern search engine and highlighted as soon as the user places his cursor 30 on the appointment pattern (cf. FIG. 6b). Clicking on the arrow 32, the user initiates the action "New Calendar Event" associated with the identified pattern (cf. FIG. 6c). FIG. 6d shows the new calendar entry 54 that has been automatically created by the system. The pattern search engine has also identified the element 56 "dinner" located next to the appointment pattern 58 as a separate event pattern. Thus, the system is able to identify patterns that are related.

Two patterns might be regarded as related if they are in close proximity to each other in the text. When the user rolls over one of several related patterns, both patterns may be highlighted to express their relatedness.

The information represented by the event pattern 56 is automatically entered in the head line field of the new entry 54, as indicated by the arrow. Furthermore, the date of the meeting 60 is automatically generated on the basis of the appointment pattern 58. As pattern 58 is only a contextual date indication ("tomorrow at 7:30 p.m."), which needs to be interpreted in the light of the context of the message, the system cannot simply copy pattern 58 into the new entry 54. The system solves this by obtaining the date of the email message from the email client of the user. Knowing the date of the email, the system can infer the exact date of the indication "tomorrow" and enter it into the entry 54. This process of using context information to deduce accurate information from context dependent patterns is visualized in FIG. 6d by the two arrows and the "Context box".

The new entry 54 may also contain a URL 62 of a special kind that points toward the original email message, allowing the user to return to the email message when viewing entry 54.

FIG. 6e shows the result of the action "New Calendar Event": a new event has been created in the user's calendar application.

FIG. 7 shows examples of structure definitions according to the invention. These structures are used by the pattern search engine to recognize interesting patterns. The structures #1, #5, #6 and #7 of FIG. 7 are similar to the conventional ones of FIG. 1, with one major difference. In FIG. 7, each structure #1, #5, #6 and #7 has been given a bonus or weighting 64. This bonus is an integer multiple of 5. Structures #1 and #5 have each been given a bonus of +5 whereas structure #7 has been given a bonus of −10 (i.e. a malus). Within structure #6, the first of the two definition items ("known city") has been given a bonus of +5.

Structures #1, #5 and the structure "known city" have been given a positive bonus because their respective definitions are rather precise, meaning that a pattern matching the definition is highly likely to be of the type defined by the structure. For example, structure #5 is a simple enumeration of strings which are known to represent streets, such as "Street" or "Boulevard" or "Road". There is a high probability that a pattern in a text that corresponds to such a string is indeed of the "Street" type.

Structure #7 has been given a malus of −10, because, as discussed earlier on, its definition is rather broad, potentially including a substantial number of false positives.

Structures #1 and #5 may be elaborated further by assigning weightings to their respective definition items. For example, structure #1 may contain the definition item "ID" referring to the US state Idaho (not shown). This definition item is preferably given a malus of −5 because the string "ID" is ambiguous. Indeed, "ID" may not only be used in a text as an abbreviation for "Idaho" but also for "Identification".

Structure #5 may contain the string "Drive" as one of its definition items in order to cover the "street type" "Drive" (not shown). However, this definition item should be given a malus as the string "Drive" may appear in various contexts in a computer text, not necessarily being a synonym for "Street".

The pattern identification method of the invention will now be described in detail with reference to FIG. 8, using as an example the structures shown in FIG. 7.

Figure 8:
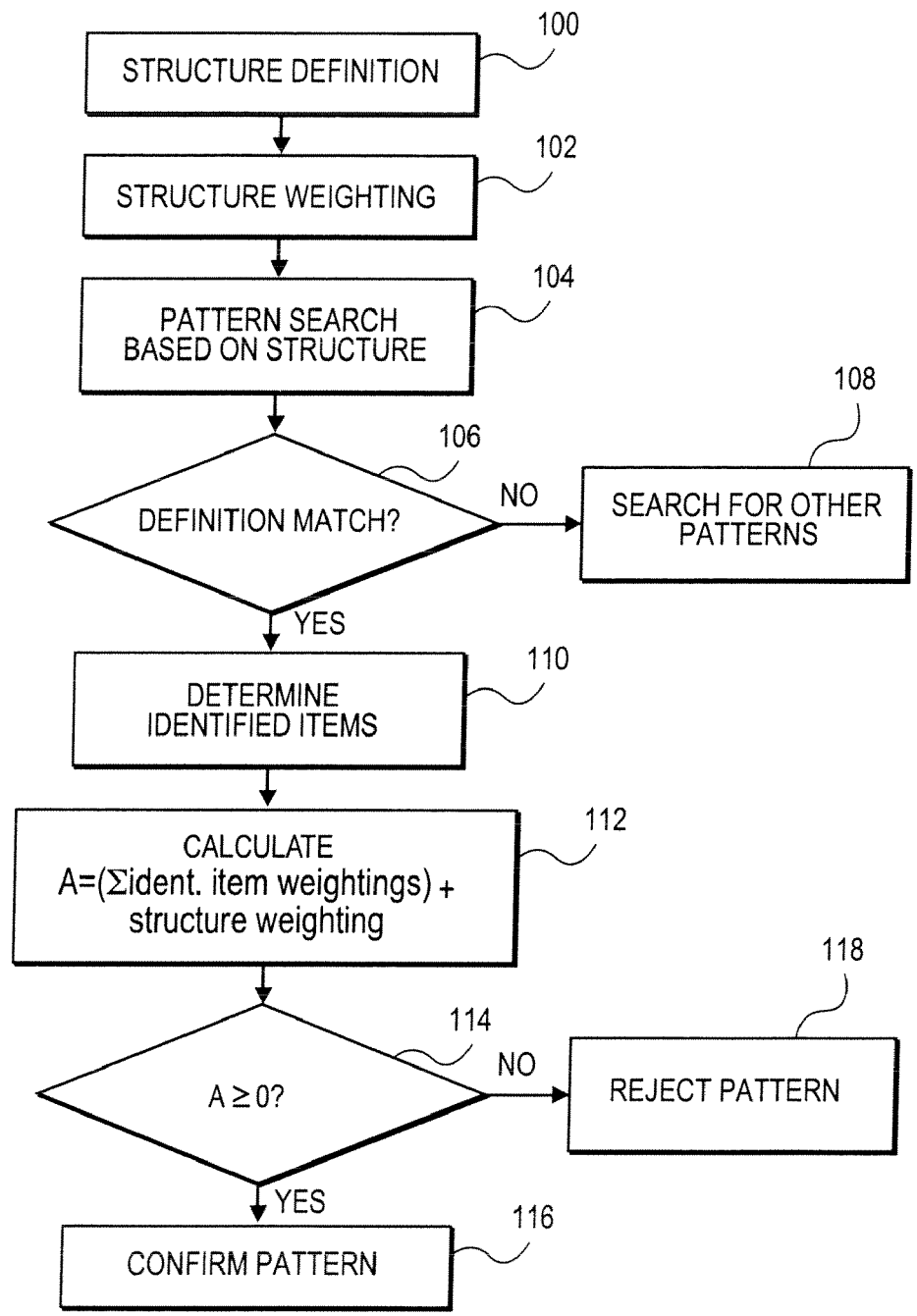
FIG. 8 is a flow chart illustrating an embodiment of a pattern identification method using weighted structures and definition items.

Operation 100 of FIG. 8 corresponds to the creation of a new structure with an associated definition. As an example, operation 100 may involve the definition of the "street address" structure #7 of FIG. 7. Structure #7 is defined as written in FIG. 7.

With operation 102, structure #7 is given a weighting w, namely w=−10 as the structure is rather broad in its definition of what may constitute a street address. Structure #7 having been defined and assigned a weighting, it may then be used by the pattern search engine to search for corresponding patterns in a text (operation 104).

Let us introduce two example texts that are to be searched by the search engine using structure #7:
Text 1:
"Our offices are located at 225 Franklin Street, 02110 MA Boston"
Text 2:
"The boys ate 4 Apple Pies"

With the conventional method using structure #7 without the weighting scheme, the underlined patterns in each of the two texts would each be identified as a "street address", leading to a false positive in the case of Text 2.

It will now be explained how the use of the inventive weighting scheme suppresses the false positive in Text 2 while detecting the correct pattern in Text 1.

In the inventive method, in the same way as the conventional method, both texts are searched for a match with the definition given by structure #7 (operation 106). If no match is found, the method goes on searching for other patterns using other structures (operation 108). However, if a match is found, "225 Franklin Street, 02110 MA Boston" (pattern 1) and "4 Apple Pies" (pattern 2) in the two texts above, it is not immediately validated as it was done conventionally. Rather, it is determined which of the definition items of the structure have been found in the identified pattern (operation 110).
Pattern 1 is therefore decomposed as follows:
Number: 225; some spaces; some capitalized words: Franklin; known street type: Street; coma; postal code: 02110 MA; some spaces; city: Boston.
Pattern 2 is decomposed as follows:
Number: 4; some spaces; some capitalized words: Apple; spaces; some spaces; city: Pie.

The next step is to calculate the sum of the weightings of all identified definition items, to which is added the weighting of the structure, giving a total sum of A (operation 112).

In the case of pattern 1, we obtain for A the value of 5 (cf. FIGS. 1 and 7):
A bonus of +5 for the presence of a known street type (structure #5),
plus
A bonus of +5 for the presence of a structure #1 "US state code" within the identified structure #3 "postal code",
plus
A bonus of +5 for the presence of a structure "known city" within the structure #6 "city" (assuming that Boston matches the definition of the structure "known city", which is not shown in the figures),
plus
A malus of −10 associated with the structure #7 "street address".

In the case of pattern 2, we obtain for A a value of −10, the value of the malus associated with structure #7, since the elements of the pattern "4 Apple Pies" do not match any of the definition items with a bonus.

In operation 114, A is then compared to a predetermined threshold, here 0. Accordingly, pattern 1 is confirmed since A=5>0 (operation 116), whereas pattern 2 is rejected since A=−10<0 (operation 118).

Hence, with the inventive weighting scheme, contrary to the prior art, false positives such as "4 Apple Pies" are spotted and discarded. The inventive method therefore renders pattern searching more effective and accurate.

The invention claimed is:

1. A machine-implemented method for identifying patterns in text using structures defining types of patterns which are to be identified, wherein a structure comprises one or more definition items, the method comprising:
assigning a fixed weighting to each structure and each definition item in each structure, each fixed weighting being an integer multiple of the same integer;
searching the text for a pattern to be identified on the basis of a particular structure, a pattern being provisionally identified if it matches the definition given by said particular structure;
in a provisionally identified pattern, determining definition items making up said particular structure that have been identified in the provisionally identified pattern;
combining the fixed weightings of the determined definition items and the fixed weighting of the particular structure to a single quantity;
assessing whether the single quantity fulfils a given condition; and
depending on the result of said assessment, rejecting or confirming the provisionally identified pattern.

2. The method of claim 1, wherein the given condition corresponds to the single quantity being above or below a given threshold.

3. The method of claim 1, wherein the single quantity is obtained by combining the fixed weightings using one or more arithmetic operations.

4. The method of claim 3, wherein the arithmetic operation is a summation over all fixed weightings, the single quantity being the sum of all the fixed weightings.

5. The method of claim 1, each fixed weighting taking the form of either a bonus in the form of a positive integer, or a malus in the form of a negative integer.

6. The method of claim 5, wherein a structure or definition item is assigned a bonus if it is well-defined, and a malus if it is ambiguous.

7. A program storage medium having a program stored therein for causing a data processing system to execute the method of any one of claims 1-4 or 5-6.

8. An apparatus for identifying patterns in text using structures defining types of patterns which are to be identified, wherein a structure comprises one or more definition items, the apparatus comprising:
a processing system coupled to memory;
means for assigning a fixed weighting to each structure and each definition item in each structure, each fixed weighting being an integer multiple of the same integer; means for searching the text for a pattern to be identified on the basis of a particular structure, a pattern being provisionally identified if it matches the definition given by said particular structure;
in a provisionally identified pattern, means for determining definition items making up said particular structure that have been identified in the provisionally identified pattern;
means for combining the fixed weightings of the determined definition items and the fixed weighting of the particular structure to a single quantity;
means for assessing whether the single quantity fulfils a given condition; and depending on the result of said assessment, means for rejecting or confirming the provisionally identified pattern.

9. The apparatus of claim 8, wherein the given condition corresponds to the single quantity being above or below a given threshold.

10. The apparatus of claim 8, wherein the single quantity is obtained by the means for combining the fixed weightings using one or more arithmetic operations.

11. The apparatus of claim 8, wherein the arithmetic operation is a summation over all fixed weightings, the single quantity being the sum of all the weightings.

12. The apparatus of claim 8, each fixed weighting taking the form of either a bonus in the form of a positive integer, or a malus in the form of a negative integer.

* * * * *

UNITED STATES PATENT AND TRADEMARK OFFICE
CERTIFICATE OF CORRECTION

| | | |
|---|---|---|
| PATENT NO. | : 7,912,828 B2 | Page 1 of 1 |
| APPLICATION NO. | : 11/710182 | |
| DATED | : March 22, 2011 | |
| INVENTOR(S) | : Olivier Bonnet et al. | |

It is certified that error appears in the above-identified patent and that said Letters Patent is hereby corrected as shown below:

On page 2, in column 2, under "Other Publications", line 2, delete "EMailman$(^{SM})$" and insert -- EMailman(sm) --, therefor.

On page 2, in column 2, under "Other Publications", line 59, delete "Syrnposium" and insert -- Symposium --, therefor.

On page 2, in column 2, under "Other Publications", line 73, delete "Bullelin" and insert -- Bulletin --, therefor.

On page 3, in column 2, under "Other Publications", line 32, delete "CapabiUties" and insert -- Capabilities --, therefor.

In column 1, line 25, delete "variants" and insert -- variants. --, therefor.

Signed and Sealed this
Twenty-ninth Day of November, 2011

David J. Kappos
*Director of the United States Patent and Trademark Office*